M. WENGER.

WRENCH.

No. 11,614. Reissued June 29, 1897.

Witnesses

Jas. E. Hutchinson.

G. F. Downing.

Inventor

Milton Wenger,

By H. A. Seymour

Attorney

UNITED STATES PATENT OFFICE.

MILTON WENGER, OF NEW HOLLAND, PENNSYLVANIA.

WRENCH.

SPECIFICATION forming part of Reissued Letters Patent No. 11,614, dated June 29, 1897.

Original No. 525,435, dated September 4, 1894. Application for reissue filed August 14, 1896. Serial No. 602,822.

*To all whom it may concern:*

Be it known that I, MILTON WENGER, a citizen of the United States, residing at New Holland, in the county of Lancaster and State of Pennsylvania, have invented a new and useful Wrench, of which the following is a specification.

My invention relates to improvements in wrenches, the objects in view being to produce a wrench either of that class designed for operating upon pipes or that class designed for operating upon nuts and to so construct the same as to render it readily and quickly adjustable by one hand of the operator and therefore reducing to a minimum the time required in adjusting and applying the wrench to nuts or pipes of various sizes.

Various other objects and advantages of the invention will appear in the following description, and the novel features thereof will be particularly pointed out in the claims.

Figure 1:
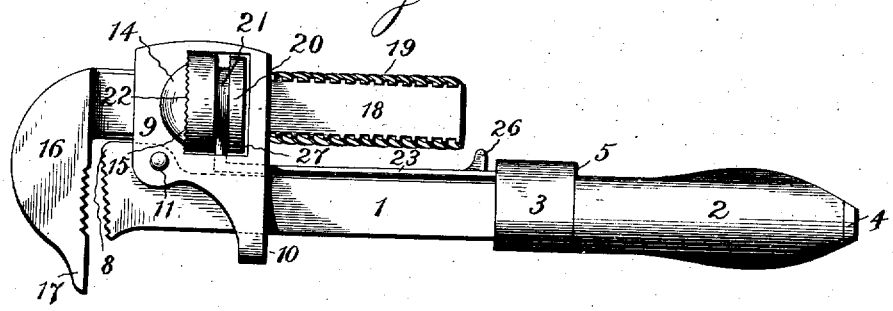
Figure 2:
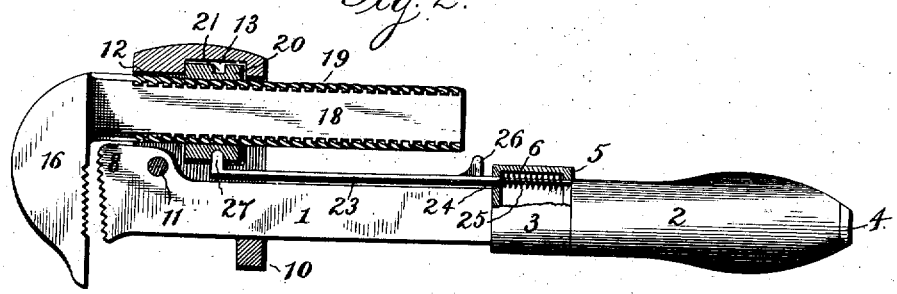
Figure 3:
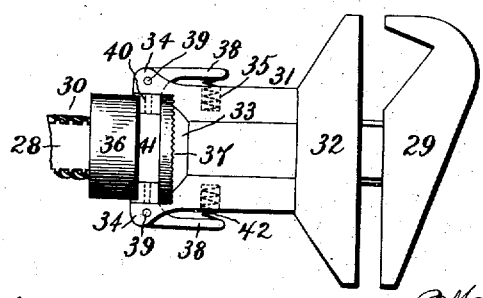

Referring to the drawings, Figure 1 is a side elevation of a wrench embodying my invention. Fig. 2 is a longitudinal sectional view of the same. Fig. 3 is a side elevation of a modified construction of wrench.

Like numerals of reference indicate like parts in all the figures of the drawings.

In practicing my invention I employ a stationary shank 1, which in the construction shown in Figs. 1 and 2 is preferably rectangular, and the same enters at its inner end a convenient handle 2, being secured in position through the medium of the usual ferrule 3 and tip-nut 4. The ferrule is provided in line with the back of the stationary shank 1 with an offset or enlargement 5, and this is longitudinally bored in the direction of the stationary shank, as indicated at 6. The outer end of the stationary shank 1 is slightly elongated transversely, so as to form a head 7, and this head is extended beyond the back of the stationary shank to form a heel or projection 8. The surface of the head 7 is provided with transverse teeth, as is usual, and the heel with a transverse pin-hole.

A yoke 9, having a loop 10, embraces loosely the stationary shank 1, and at its corners, above and in rear of the loop 10, is by a transverse pivot-pin 11 fulcrumed upon the stationary shank 1 at the heel thereof.

In rear of the point of the pivot yoke 9 has a longitudinal passage or bore 12, rectangular in cross-section, and a transverse opening 13 communicating therewith, and at the upper edge of said transverse opening and at opposite sides of the yoke the same is further provided with semicircular enlargements 14, whose rear faces are provided with radial teeth 15.

The movable head or jaw 16 is located in advance of the head or jaw 7 and extends beyond the front of the same, forming a nose 17, while its inner face is toothed, as is usual. The jaw 16 is formed upon a movable shank 18, substantially rectangular in cross-section, and the same occupies and is designed to slide within the passage 12 of the yoke 9. This movable shank 18 has its front and rear edges provided with continuations of a series of threads 19, having a long pitch, much longer than the usual screw, and designed to work loosely thereon is a cylindrical nut 20, whose interior is bored and provided with a plurality of spiral grooves which agree in pitch with and loosely receive the threads 19 of the movable shank 18. This nut is provided with an annular external groove 21 and has its outer face provided with a series of teeth 22, which are inclined opposite to the teeth 15 of the yoke.

23 designates a rod whose inner end is seated in the bore 6 of the offset 5 of the ferrule 3, and said rod within the offset has an annular shoulder 24. Encircling the rod and interposed between the annular shoulder and the inner end of the bore 6 is a light coiled spring 25, which bears against the shoulder 24 of the rod and therefore normally forces the rod outward. Immediately in advance of the ferrule 3 the rod is provided with a finger rest or pull 26, and at its forward extremity, which is opposite the groove 21 in the nut 20, is provided with a curved yoke 27, which loosely engages the said groove 21 of the nut 20 and in such manner as to permit the nut to readily rotate without impediment from the yoke. Through the medium of the spring 25 the rod is forced, as before stated, to the front, and in this manner are the teeth of the nut 20 engaged with the teeth 15 of the yoke 9.

In operation the wrench may be handled by one hand and as follows: In order to open the jaws, the operator engages the nose 17 of the head or jaw 16 over any fixed object—such as a workbench, a vise, a rod, pipe, &c.—and, drawing upon the handle 2, causes the stationary shank 1 to move to the rear or toward the operator, the nut 20 being rotated as the two jaws separate. Such rotation upon the part of the nut 20 is permitted by reason of the fact that the teeth of the same have in the meantime been disengaged from the teeth of the yoke, which the operator accomplishes simultaneously with the opening operation by means of one finger, which he employs to engage the rest 26 and draw the rod 23 inward against the spring 25, which rod through the yoke 27 causes the aforesaid disengagement of the teeth of the nut and yoke 9. When a suitable separation of the jaws has been accomplished, the same are slipped over the nut or rod, and the operation is carried on in the ordinary manner. Immediately that the rod 23 is released from the pressure of the finger of the operator the spring 25 forces the same forward and causes a reëngagement of the teeth 22 of the nut with the teeth 15 of the yoke 9. If it is desired to close the jaws, the operation is very simple, in that the operator first draws the rod 23 inward, disengaging the nut, and pushes the wrench against any fixed object that may be at hand, thus causing the nut to rotate in the reverse direction.

It will be seen that a locking of the movable jaw may take place at any time the operator desires and is accomplished simply by releasing the rod 23.

In the modification illustrated in Fig. 3 of the drawings the same principle is carried out, with the exception that but one shank is employed, or, in other words, both jaws are mounted upon the same shank. In this figure the shank 28, which corresponds to the shank 18, is provided at a suitable point in rear of its outer fixed head 29 at its front and rear edges with continuations of a plurality of series of superficial spirals 30. The head 29 may be adapted either for nut or pipe work, but in the present instance is for both. The yoke 31 is mounted for sliding upon the shank 28 and carries at its outer end the fixed jaws 32. The lower or inner end of the yoke 31 is flared, as at 33, the under side being provided with a series of radial teeth, and at each side of this flared end and slightly below the same in rear thereof is provided with diametrically opposite pairs of bearing-ears 34 and in advance of the same with countersunk recesses 35.

36 designates a cylindrical nut interiorly bored and adapted to fit the threads 30 in the shank 28 upon which said nut is designed to slide. The nut has its outer face provided with a series of threads 37, which engage with the threads at the lower end of the yoke 31.

Pairs of L-shaped levers 38 are pivoted at their angles by pivot-pins 39, between the pairs of ears 34, and the lower or inner ends of these levers terminate in bearings upon which are mounted loose friction-rollers 40, which take loosely within an annular groove 41, with which the nut is provided.

Seated in the countersunk recesses 35 of the yoke are coiled springs 42, the same having their outer ends bearing outwardly against the forward ends or branches of the L-shaped levers 38. It will be seen that these springs 35 cause the L-shaped levers to maintain the nut 36 in engagement with the teeth at the lower end of the yoke, so that the nut and yoke are locked together, and the yoke, having a rectangular bore to fit the shank, cannot rotate, and hence neither can the nut. When, however, it is desired to adjust the movable jaw to any point along the shank, it is simply necessary to compress the forward or outer ends of the levers 38, and they, moving on their pivots 39, disengage the teeth of the nut 36 from the teeth of the yoke, and by holding the levers thus compressed and grasping the handle of the wrench the shank 28 may be moved in either direction through the yoke. It will thus be seen that in either instance I have illustrated an embodiment of my principle. The adjustment of the wrench is accomplished with great facility and despatch, and particularly is this true in regard to that construction of wrench illustrated in Figs. 1 and 2 of the drawings, and, furthermore, it will be apparent that in both instances the jaws may be instantly locked at any point desired, and, finally, that when locked I obviate the great objection in screw-wrenches—namely, the liability of the jaws becoming thrown out of adjustment during operation and as caused by the nut working upon the shank.

It is to be understood that changes in the form, proportion, and the minor details of construction may be resorted to without departing from the principle or sacrificing any of the advantages of this invention.

Having described my invention, what I claim is—

1. The combination with a stationary shank and a movable shank, each having a head or jaw at one end and one of said shanks having threads of long pitch, of a nut carried by one of said shanks and having threads to mesh with the threads on the other shank and means for locking the nut at any point of its rotation.

2. The combination with a stationary shank having a head at one end, of a movable shank having a jaw which coöperates with the head on the stationary shank and is adapted to receive the nut to be turned between it and the head, the movable shank having threads of long pitch, a nut through which the movable shank passes, and means for locking the nut at any point of its rotation, substantially as set forth.

3. In a wrench, the combination with a stationary shank terminating at one end in a jaw, and at its opposite end in a handle, of a yoke loosely embracing the shank pivoted thereto in rear of the shank at which point it is bored longitudinally and provided with a transverse opening one edge of which is provided with teeth, a movable jaw in advance of the fixed jaw and provided with a shank having screw-threads, said shank being passed through the bore of the yoke, a nut mounted loosely in the opening of the yoke, receiving the shank and interiorly grooved in accordance with the threads of the shank, said nut being provided upon one of its faces with teeth, and means for pressing the teeth of the nut normally into engagement with those of the yoke, substantially as specified.

4. In a wrench, the combination with a stationary shank terminating at its inner end in a handle and at its outer end in a head, of a yoke loosely embracing and fulcrumed on the stationary shank, a movable jaw in advance of the fixed jaw and terminating at its rear end in a shank having a plurality of threads, said shank passing loosely through and adapted to slide within the yoke, a nut loosely engaged by the yoke receiving the shank and provided with internal grooves agreeing therewith, and means for locking the nut at any point of its rotation, substantially as specified.

5. In a wrench, the combination with a stationary shank terminating at its inner end in a handle and at its outer end in a head, of a yoke loosely embracing and pivoted to the stationary shank said yoke being longitudinally bored and provided with a transverse opening, a movable jaw in advance of the fixed jaw, a movable shank extending at an angle from the fixed jaw passing through the bore of the yoke and provided with a plurality of threads, a nut mounted for rotation in the opening of the yoke and internally bored and grooved to receive and conform to the movable shank, said nut having an annular groove, teeth formed on the adjacent faces of the yoke and nut, a rod engaging the groove of the nut and a spring mounted on the rod for normally pressing the same outward and the teeth of the nut into engagement with those of the yoke, substantially as specified.

6. In a wrench, the combination with the stationary shank 1 terminating at its inner end in a handle, and an offset provided with a bore, and at its outer end terminating in a head or jaw, of a yoke loosely receiving said shank and pivoted at its front inner corner thereto, said yoke in rear of the stationary shank having a longitudinal bore angular in cross-section and provided with a transverse opening, the forward edges of which are provided with enlargements having teeth, the nut mounted in the opening and having its front face provided with teeth engaging those of the yoke and in rear of the teeth provided with an annular groove, a movable jaw in advance of the fixed jaw, the same having a rearwardly-disposed shank rectangular in cross-section to loosely fit and slide within the yoke, and having its front and rear edges provided with continuations, of a plurality of threads engaging corresponding grooves in the nut, a rod seated for reciprocation in the recess or socket of the handle and having a finger-pull at one side in advance of the socket and its forward end terminating in a yoke for loosely engaging the angular groove in the nut, and a coiled spring interposed between the base of the socket, coiled upon the rod and abutting against a shoulder formed thereon substantially as specified.

7. In a wrench the combination with a stationary shank terminating at its forward end in a jaw and at its inner end in a handle, and a yoke loosely receiving the shank and fulcrumed upon the same in rear of the jaw, said yoke having a longitudinal bore and a transverse opening, of a movable shank threaded and mounted loosely in the bore, a cylindrical nut bored to receive the movable shank having grooves to receive the threads thereof and loosely mounted for rotation in the opening of the yoke, means for locking the nut against rotation, and a movable jaw located at the outer end of the shank in advance of the fixed jaw and having an extension or nose projecting beyond that of the fixed jaw, substantially as specified.

8. In a wrench, the combination of a fixed jaw or head, a yoke connected with said head and having a series of radial teeth, an exteriorly-threaded shank embraced by said yoke and carrying a jaw or head opposed to the fixed jaw or head, a turning nut loosely mounted in the yoke and upon said shank and having a series of radial teeth, and means for normally holding the teeth of the nut into engagement with those of the yoke, substantially as set forth.

In testimony whereof I have signed this specification, in the presence of two subscribing witnesses, this 28th day of July, 1896.

MILTON WENGER.

Witnesses:
E. L. SUTTON,
ELI M. MARTIN.